United States Patent Office 2,983,720
Patented May 9, 1961

2,983,720

POLYMERIZATION OF BUTENE-1 WITH CATALYST OF TITANIUM TETRACHLORIDE, ALUMINUM TRIETHYL, AND DIETHYL ALUMINUM CHLORIDE

Robert F. Leary, Cranford, and Lewis W. Bowman, Westfield, N.J., assignors to Esso Research and Engineering Company, a corporation of Delaware No Drawing. Filed Apr. 9, 1956, Ser. No. 576,772

1 Claim. (Cl. 260—93.7)

This invention relates to polymerization and more particularly relates to an improved method for polymerizing butene-1 at elevated pressure.

In brief, the present process comprises polymerizing butene-1 at an elevated pressure in the presence of a catalyst obtained by mixing aluminum trialkyl, aluminum dialkyl monohalide and a reducible compound of titanium wherein the molar (or atomic) ratio of aluminum to the titanium in the catalyst is about 1.5/1 to 4/1.

The polymerization of butene-1 in accordance with the present invention is carried out at elevated pressure. More particularly, the polymerization reaction is carried out a pressure of at least about 50 p.s.i.g. (pounds per square inch gauge). Pressures as high as 2,000 p.s.i.g. or higher may be employed, if desired. Generally, it is preferred to employ pressures in the range of about 100 to 800. Generally, the polymerization reaction temperature will be maintained in the range of about 25° C. to 85° C. Lower temperatures or higher temperatures (e.g., up to about 200° C.) may be employed if desired.

The catalyst employed in the present polymerization process is obtained by mixing together three components, namely (1) aluminum trialkyl, (2) aluminum dialkyl monohalide and (3) a reducible compound of titanium. The aluminum trialkyls useful in this invention have the formula $$AlR_3$$

where R is an alkyl group, preferably an alkyl group containing 2 to 4 carbon atoms. For a given aluminum trialkyl, it will be understood that the R radicals may be different alkyl groups. Specific examples of aluminum trialkyls include aluminum triethyl, aluminum tripropyl, aluminum tributyl, aluminum diethyl propyl, aluminum ethyl dibutyl, etc. The preferred aluminum trialkyl of this invention is aluminum triethyl because this compound can be prepared simply and inexpensively and is particularly effective in the present process.

The aluminum dialkyl monohalides useful in this invention have the formula $$AlR'_2X$$

where R' is an alkyl group and X is a halogen atom. Preferably R' is an alkyl radical containing 2 to 4 carbon atoms. For a given compound it will be understood that the R' radicals may be different alkyl groups. It is preferred that X be chlorine, bromine or iodine. Chlorine is particularly preferred; bromine is second choice. Specific examples of the aluminum dialkyl monohalides useful in present process include aluminum diethyl chloride, aluminum diethyl bromide, aluminum diethyl iodide, aluminum dibutyl chloride, aluminum ethyl butyl chloride, etc. The preferred aluminum dialkyl monohalide in the present process is aluminum diethyl chloride because this compound can be prepared simply and inexpensively and is particularly effective in the present process for polymerizing butene-1. The preferred reducible compound of titanium in the present invention is titanium tetrachloride ($TiCl_4$).

The catalyst is prepared by mixing the three catalyst components together in the presence of an inert liquid diluent. Since an inert liquid diluent is also employed in the polymerization process, it will be preferred generally to use the same diluent in the catalyst preparation as is employed in the polymerization reaction. The preferred inert liquid diluents useful in this invention are hydrocarbons, preferably saturated aliphatic hydrocarbons containing about 5 to 10 carbon atoms. Specific examples of such hydrocarbon diluents include pentane, hexane, heptane, octane, nonane and decane. Hexane and particularly n-heptane are preferred diluents.

It has been found that the mole ratio of the aluminum compound to the titanium compound in the catalyst mixture is particularly critical for the purposes of the present invention; i.e., it is possible at only certain critical ratios of aluminum to titanium to obtain high yields of high molecular weight polybutene-1, based on the amount of catalyst employed. More particularly, it is necessary that the molar ratio of aluminum to titanium be about 2:1 to 3:1. The molar ratio of the trialkyl aluminum to the dialkyl aluminum halide is desirably about 1:1.

Generally the three catalyst components will be mixed together in the inert liquid diluent at a temperature of about 25° to 50° C. for about 0.25 to 1 hour. Generally, it is convenient to mix the catalyst components together at room temperature. Higher or lower temperatures and longer or shorter mixing periods may be employed if desired, but generally it has been found that the aforementioned specific mixing conditions are preferred. A finely divided precipitate (or slurry) is formed in the inert liquid diluent when the three catalyst components are admixed therein.

The butene-1 stream fed to the polymerization zone may be pure butene-1 or may be a stream containing about 10 up to 100% of butene-1, the remainder being inert components such as butane. It is important that materials which would poison the catalyst be removed from the butene-1 feed stream. Such poisons include oxygen, carbon monoxide, water, acetylene, etc. These poisons may be removed by passing the butene-1 through a solution of aluminum trialkyl, e.g., aluminum triethyl, prior to passing the stream to the polymerization reaction zone. These poisons may also be effectively removed by passing the butene-1 stream through a bed of activated silica. Similarly the inert liquid diluent may likewise be passed through such purifying materials.

The concentration of butene-1 in the polymerization reaction zone may be from about 10 to 95% by weight of the total reaction mixture (including the inert liquid diluent). When the concentration of butene-1 is maintained below about 30 weight percent of the total reaction mixture, the product is a viscous slurry. At higher concentrations the product approaches a near solid mass and it is therefore desirable to operate the process in the range of about 10 to 30 weight percent butene-1, based on the total reaction mixture. Generally the catalyst concentration in the polymerization reaction zone should be maintained in the range of about 0.1 to 3.0%, preferably about 0.5 to 1.5%, by weight, based on the butene in the reaction mixture. Polymerization reaction times in the range of about 0.1 to 100 hours may be employed although usually polymerization reaction times in the range of about 0.5 to 10 hours will be employed.

Upon the completion of the polymerization reaction, the polymerization reaction mixture is preferably quenched with a material such as acetone or an alcohol. Preferred quenching materials are aliphatic hydrocarbon alcohols containing about 1 to 4 carbon atoms. Specific examples of such quenching agents include isopropyl alcohol and n-butyl alcohol. These quenching agents solubilize the catalyst and thereby deactivate the catalyst. The oil-insoluble (e.g., n-heptane insoluble) portion of the polymer of the polybutene-1 product may be removed from the remainder of the reaction mixture by filtration or centrifuging. The oil-soluble (e.g., n-heptane soluble) portion of the polybutene-1 product may be recovered by extraction with a suitable hydrocarbon such as pentane, hexane or heptane, then stripping at atmospheric pressure or reduced pressure. The polybutene-1 products may be further purified by washing with hot alcohol in several stages.

The polybutene-1 products of this invention have intrinsic viscosities generally within the range of about 0.2 to 6.0, usually in the range of about 0.3 to 2.5. These intrinsic viscosities correspond generally to molecular weights in the range of about 5,000 to 500,000, usually about 10,000 to 100,000. The molecular weights referred to herein are obtained from the correlation of Harris in the Journal of Polymer Science, vol. 8, 361 (1952).

These polymers are particularly suitable for use as addition agents to lubricating oils and greases. Addition of the polymer to soap-thickened or polyethylene-thickened greases complements the soap thickener and imparts adhesive and non spatter qualities not previously present.

The invention will be more fully understood by reference to the following example. It is pointed out, however, that the example is given for the purpose of illustration only and is not to be construed as limiting the scope of the present invention in any way.

*Example*

The polymerization of butene-1 was carried out using the following general procedure. The preparation of polybutene-1 was carried out in a heavy nickel-free stainless steel reactor, type 410 (13% Cr) sealed with a copper gasket. Agitation and obtained by rocking the reactor back and forth during the reaction by means of an electric motor. A thermocouple well in the reactor made it possible to record temperatures throughout the run and also to control temperature by means of a Celectray.

Connected to the reactor by means of high pressure stainless steel tubing and a high pressure stainless steel valve was a stainless steel reservoir in which the butene-1 could be collected a a liquid and which, in turn, was connected to a cylinder of nitrogen by means of stainless steel tubing and valve, so that the liquid-butene-1 could be forced into the reactor by means of nitrogen pressure.

In operation the reactor was placed in a nitrogen filled dry box together with the equipment needed for preparation and transfer of the catalyst and solvent. After all air had been displaced with nitrogen the desired quantities of catalyst and solvent were transferred to the reactor and the cap was put on. The reactor was then taken from the dry box and placed in the rocker. In the meantime, the desired amount of butene-1 was condensed in the feed reservoir and this was pressurized with nitrogen. The connection was made between the reservoir and the reactor. The rocker was started and the reactor heated electrically to the desired temperature. Butene-1 was then carefully valved into the reactor in portions. After all the olefin had been added the temperature was maintained at the desired level by electrical heating. At the end of the desired reaction period, the reactor was allowed to cool to room temperature and was vented through a knock-out flask and wet test meter. The reactor was then opened and the contents transferred to a flask containing 99% isopropyl alcohol. The mixture was refluxed several hours until the product became almost white, then was cooled and filtered and the precipitate was washed with more isopropyl alcohol. The solid white polymer was air dried, then dried further in a vacuum oven at 70° C. and was then weighed. The filtrate was evaporated to dryness to give an indication of the amount of oily polymer formed.

A series of runs were carried out in accordance with the above procedure in which the molar ratio of the aluminum to titanium was varied. The following data were obtained:

| Run | 1 | 2 | 3 | 4 | Remarks |
|---|---|---|---|---|---|
| Catalyst: | | | | | |
| Al(Et)$_2$Cl, gram | 2.0 | 1.0 | | 2.0 | |
| AlEt$_3$, gram | 2.0 | 1.0 | 2.0 | | |
| TiCl$_4$, gram | 1.0 | 1.0 | .54 | .54 | |
| Butene-1, gram | 296 | 323 | 350 | 350 | |
| Temperature, °C | 23–65 | 25–84 | 75–80 | 75–80 | |
| Pressure (p.s.i.g.) | 175–400 | 400–500 | 800 | 800 | |
| Run length, min. | 4,020 | 2,520 | 2,400 | 2,400 | |
| Polymer, gm | 165.5 | 232 | 15 | [1] 67 | Includes 12 gm. liq. polymer.[1] |
| Al/Ti ratio | 6/1 | 3/1 | 6/1 | 6/1 | |
| Catalyst Eff., gms. prod./gm. cat. | 32.5 | 75 | 6 | 27 | Solid polymer only.[1] |
| I.V. Polymer | 1.87 | 1.34 | 1.3 | [1] 0.7 | |

The above data show that the catalyst efficiency is increased almost 2.5 times by changing the Al/Ti ratio from 6/1 to 3/1. Furthermore, an equal mixture of aluminum triethyl and aluminum diethyl chloride is better than either alone.

The nature of the present invention having been thus fully set forth and a specific example of the same given, what is claimed as new and useful and desired to be secured by Letters Patent is:

A method for preparing solid polybutene-1 which comprises polymerizing butene-1 at a temperature of about 25° to 85° C. and at a pressure of about 50 to 800 p.s.i.g. in a saturated aliphatic hydrocarbon of 5 to 10 carbon atoms in the presence of a catalyst obtained by the inter-reaction of a mixture consisting of aluminum triethyl, diethyl aluminum chloride and titanium tetrachloride in a saturated aliphatic hydrocarbon of 5 to 10 carbon atoms, the molar ratio of aluminum triethyl to diethyl aluminum chloride being about 1:1, the molar ratio of aluminum to titanium being about 3:1, and the concentration of butene-1 in the reaction mixture being in the range of 10 to 30 wt. percent.

References Cited in the file of this patent

UNITED STATES PATENTS

| | | |
|---|---|---|
| 2,439,528 | Roedel | Apr. 13, 1948 |
| 2,440,498 | Young et al. | Apr. 27, 1948 |
| 2,593,417 | D'Alelio | Apr. 22, 1952 |
| 2,827,446 | Breslow | Mar. 18, 1958 |
| 2,838,477 | Roelen et al. | June 10, 1958 |
| 2,839,518 | Brebner | June 17, 1958 |
| 2,889,314 | Fritz | June 2, 1959 |
| 2,904,542 | Fasce et al. | Sept. 15, 1959 |
| 2,906,742 | Thomka | Sept. 29, 1959 |

FOREIGN PATENTS

| | | |
|---|---|---|
| 538,782 | Belgium | Dec. 6, 1955 |